Figure 1:
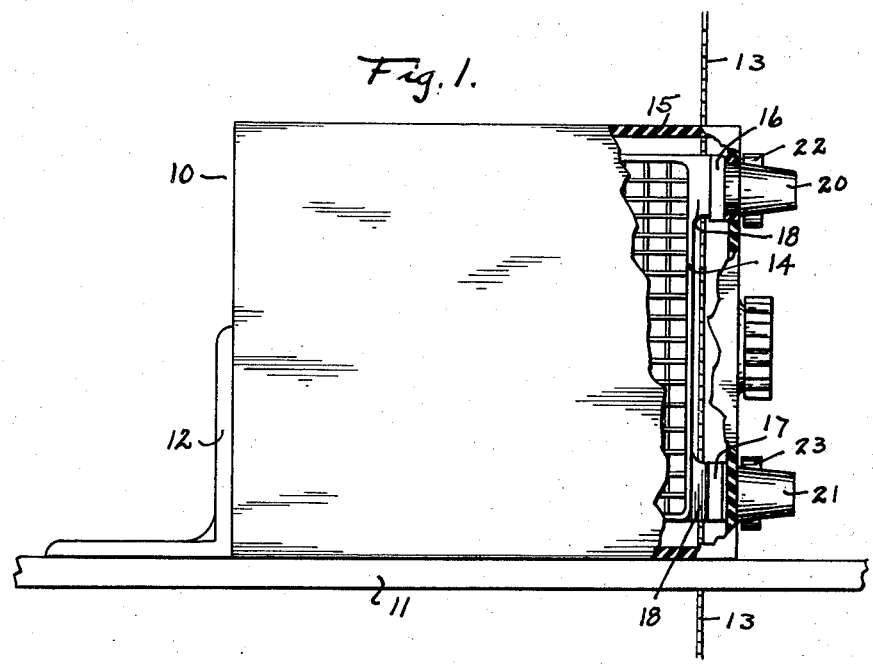

April 9, 1946.  H. A. ALPERT  2,398,275

METHOD OF SALVAGING BATTERY LEAD

Filed May 19, 1943

INVENTOR.
Harry A. Alpert,
By Herbert A. Minturn,
Attorney.

Patented Apr. 9, 1946

2,398,275

UNITED STATES PATENT OFFICE 2,398,275

METHOD OF SALVAGING BATTERY LEAD

Harry A. Alpert, Indianapolis, Ind.

Application May 19, 1943, Serial No. 487,667

3 Claims. (Cl. 136—174)

This invention relates to means for salvaging lead from storage batteries. Heretofore storage batteries which have been junked have presented a difficult problem of economically opening the battery cases in order to permit removal of the grids and connectors. Two grades of lead are to be obtained from the old batteries, namely, the inferior grade, in so far as purity of the lead is concerned, in the plates or grids, and the higher grade of lead in the terminal posts, outside connector bars, and the inner plate connecting bars.

Heretofore the battery boxes have been broken open by sledge hammers or chopped open with axes, such operations requiring a considerable amount of time which is quite expensive, particularly at the present schedule of wages. Not only was considerable time expended, but the job was considerably messy with acid and plate material flying out over the worker. The battery boxes themselves present no material worth salvaging.

My invention has a primary advantage in that the battery box is sawed open in one operation which simultaneously separates the two grades of lead, one from the other, all in one operation. Moreover in respect to the heretofore method of breaking the battery boxes open, around five hundred batteries may be handled per hour as compared to not over twenty by the old method, all of which means that the battery lead may be recovered at a much lower cost than heretofore.

Figure 2:
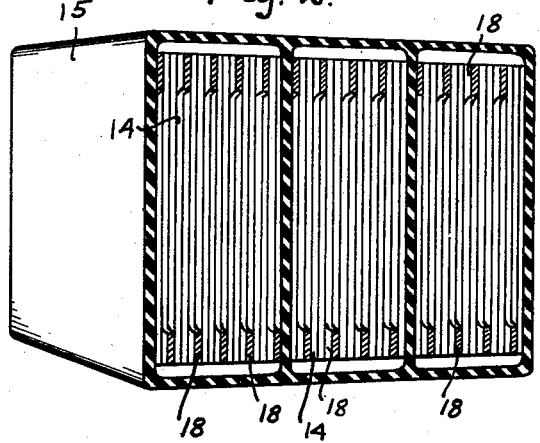

Referring to the drawing,

Fig. 1 illustrates a battery in end elevation placed on a table on its side with the sawing operation initiated;

Fig. 2, a view in perspective of the opened top end of the battery box; and

Figure 3:
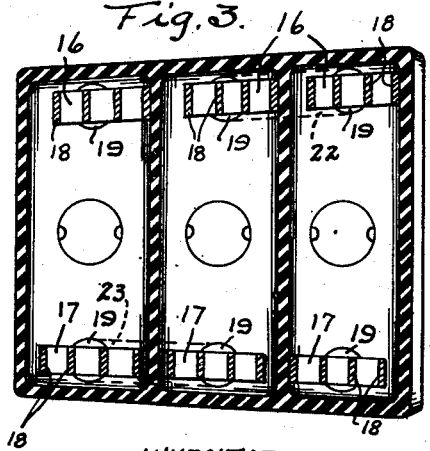

Fig. 3, a view in perspective of the under side of the battery cover as severed from the box.

Like characters of reference indicate like parts in the several views in the drawing.

The battery 10, from which the lead is to be salvaged, is placed upon any suitable conveyor or table 11 on its side to have its bottom against a guide or stop 12. A saw, preferably a band saw 13 is arranged to travel vertically in the path of the battery 10 as it may be shifted on the table 11. The spacing between the saw 13 and the guide 12 is made to be such for the particular size and type of battery that the plane of the saw will be located to be spaced outwardly from the plane of the top edges of the plates 14 within the battery box 15. Furthermore, the path of the saw 13 is located to be not only in spaced relation from the normally top edges of the plates 14 but also between those plate edges and the normally under sides of the plate connectors 16 and 17.

The battery 10 is fed or pushed on across the table 11 in any suitable manner, either automatically or manually, until the saw 13 has cut entirely through the battery box 10 from end to end to form two portions as indicated in Figs. 2 and 3. Referring to Fig. 2, the box 15 has been cut through to leave the lead plates within the various cells of the box in their normal positions. The saw cut is made through the lug portions 18 of the various plates 14 whereby the minimum cutting of lead is made. By upending the box 15, the severed plates may be shaken out of the box 15 without further manipulation. The upper portion of the box, shown in Fig. 3, carries the plate connectors 16 across the one side and connectors 17 across the other side. The posts 19 from these connectors extend on through the cell covers of the box to carry the battery terminals 20 and 21 and also the intercell connectors 22 and 23.

All of the lead carried by this top severed section is of a higher degree of purity than that of the plates left in the box 15. This lead carried by the cover portion may be separated therefrom by one or more sharp blows to cracks the cover part away from the lead.

Preferably the battery is initially drained of acid. As the saw 13 passes through the box, there is no uncontrolled splashing of acid over the operator. It is therefore to be seen that by the method of this invention, one simple sawing operation opens up the battery box without the heretofore repeated blows required to batter open the box. Moreover, the cell plates are left in position in the box 15 whereby they may be readily dumped out into convenient tote boxes or the like for transportation without further handling.

I claim:

1. The method of salvaging lead from storage batteries which comprises sawing through the battery box and plate lugs in a plane substantially parallel to the top edges of the battery plates between the battery plates and the plate connectors, dumping the severed plates from the battery box, and breaking the battery box cover away from the lead carried thereby, whereby two grades of lead may be separately recovered.

2. That method of removing the lead plates, plate connectors, terminal posts, and cell connectors from the box of a storage battery for salvage purposes, which comprises draining the battery, placing the battery on its side and moving the battery across the path of a saw to have the saw relatively pass entirely through the battery box and plate lugs immediately under the plate connectors to sever the connectors therefrom and cut off a top portion of the battery box, withdrawing the severed plates from the box, and breaking the said top portion away from the lead remaining thereon.

3. Those steps in salvaging lead from a storage battery which consist in cutting through the battery box and plate lugs in substantially a plane between the top edges of the battery plates and the under sides of the plate connectors, and breaking away from the lead the severed battery box parts.

HARRY A. ALPERT.